(12) United States Patent
Steffensen

(10) Patent No.: US 12,504,673 B2
(45) Date of Patent: Dec. 23, 2025

(54) FISHING CAMERA

(71) Applicant: Fairpoint Outdoors A/S, Allerød (DK)

(72) Inventor: Michael Trøst Steffensen, Frederiksberg C (DK)

(*) Notice: Subject to any disclaimer, the term of this patent is extended or adjusted under 35 U.S.C. 154(b) by 0 days.

(21) Appl. No.: 18/738,121

(22) Filed: Jun. 10, 2024

(65) Prior Publication Data

US 2025/0004353 A1    Jan. 2, 2025

(30) Foreign Application Priority Data

Jun. 30, 2023    (DK) .............................. PA202370350

(51) Int. Cl.
*G03B 17/08*    (2021.01)

(52) U.S. Cl.
CPC .................................... *G03B 17/08* (2013.01)

(58) Field of Classification Search
CPC ......... G03B 17/08; G03B 15/00; A01K 91/06
See application file for complete search history.

(56) References Cited

U.S. PATENT DOCUMENTS

| | | |
|---|---|---|
| 6,698,373 B2 | 3/2004 | Geriene |
| 6,804,910 B1 | 10/2004 | Sharp |
| 8,515,269 B2 | 8/2013 | Londeree |
| 9,066,505 B1 | 6/2015 | Vedder |
| 9,507,243 B2 | 11/2016 | Bianciardi |
| 10,457,366 B2 | 10/2019 | Warnan |
| 2013/0107031 A1 | 5/2013 | Atkinson |
| 2017/0042136 A1 | 2/2017 | Anderson |
| 2017/0280693 A1* | 10/2017 | Lehl ...................... A01K 97/00 |
| 2018/0192624 A1 | 7/2018 | Chen |
| 2019/0281802 A1* | 9/2019 | Cherry ................ A01K 91/047 |
| 2023/0012718 A1 | 1/2023 | Van Heerden |

FOREIGN PATENT DOCUMENTS

| | | |
|---|---|---|
| CN | 214948058 U | 11/2021 |
| CN | 216700109 U | 6/2022 |
| JP | 1973S4861285 A | 8/1973 |
| JP | 1979S5446790 U | 3/1979 |
| JP | S5945557 B2 | 4/1980 |
| JP | S5855115 Y2 | 6/1981 |
| JP | S62115225 A | 5/1987 |

(Continued)

OTHER PUBLICATIONS

Dictionary of Ship Hydrodynamics, ITTC (2008).

(Continued)

*Primary Examiner* — Stephanie E Bloss
*Assistant Examiner* — Fang-Chi Chang

(57) ABSTRACT

An underwater camera assembly to be pulled through water in a forward direction in front of a fishing lure is provided. An elongated main body holding a camera in a waterproof manner has a line attachment system positioned on the lower part of the main body. The camera assembly has a front tongue extending downwardly and forwardly from a lower, front part of the main body and configured to exert a downward force on the main body pulled through water in the forward direction. The assembly comprises stabilizing fins extending laterally from a rear-end part of the main body. The camera assembly has a very low mass while still providing improved stability and depth control during trolling.

10 Claims, 4 Drawing Sheets

(56) References Cited

FOREIGN PATENT DOCUMENTS

| | | |
|---|---|---|
| JP | S6418798 A | 1/1989 |
| JP | 1994H0686463 U | 12/1994 |
| JP | 1995H07274787 A | 10/1995 |
| JP | 1996H08116843 A | 5/1996 |
| JP | H08332995 A | 12/1996 |
| JP | 19973036375 U | 4/1997 |
| JP | 1998H10276644 A | 10/1998 |
| JP | 2002112668 A | 4/2002 |
| JP | 2002112684 A | 4/2002 |
| JP | 2003061529 A | 3/2003 |
| JP | 2005143446 A | 6/2005 |
| JP | 2008113628 A | 5/2008 |
| JP | 2019525686 A | 9/2019 |
| WO | 1990011927 A1 | 10/1990 |
| WO | 2020/260732 A1 | 12/2020 |

OTHER PUBLICATIONS

Engineering report on high-tail hydrofoil, Office of Naval Rsearch (1960).
Hydrofoil Basics—Configurations, John Meyer, International Hydrofoil Society (1998).
Hydrofoil Ship Design, International Hydrofoil Society, William C. O'Neill (2004).
Numerical Simulation of Fluid-Structure Interaction Between Fishing Wobbler and Water, Miroslav Mijajlovic (2020).

* cited by examiner

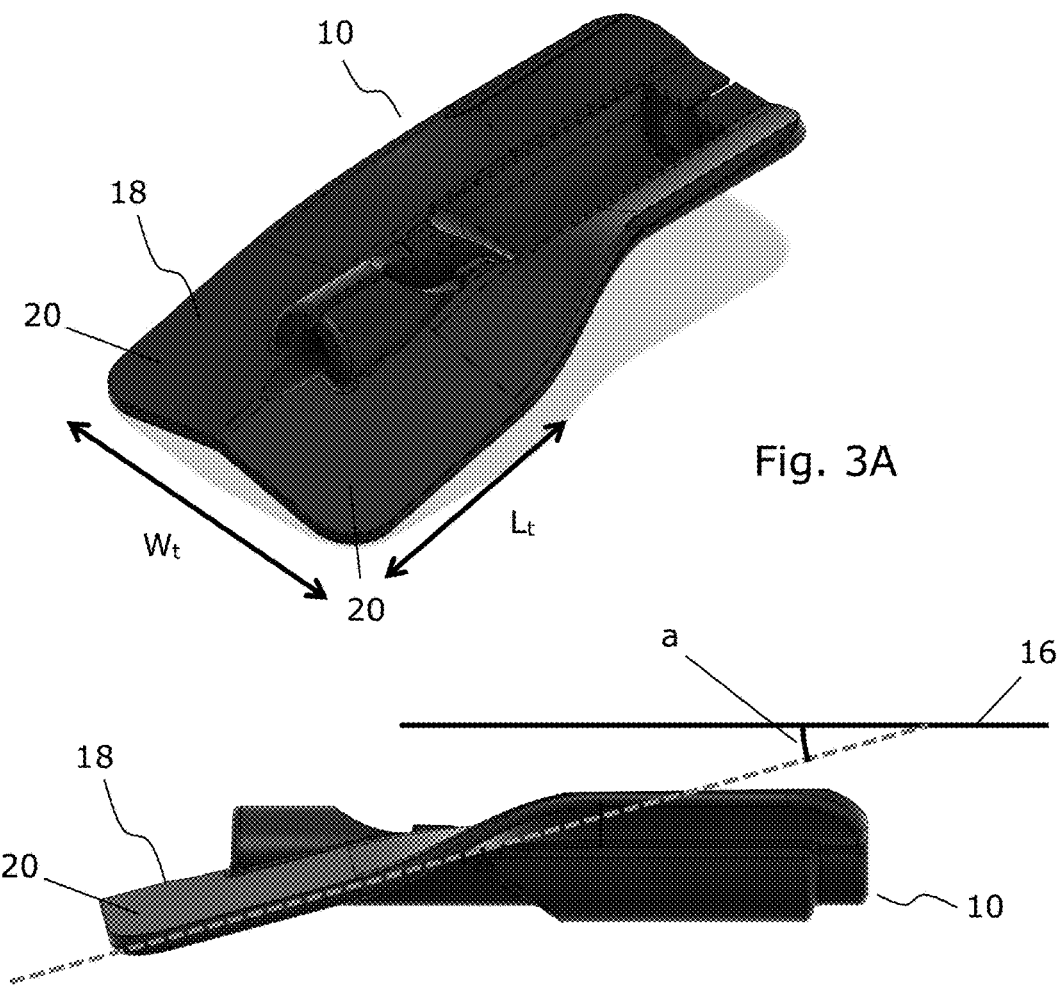
Fig. 3A
Fig. 3B
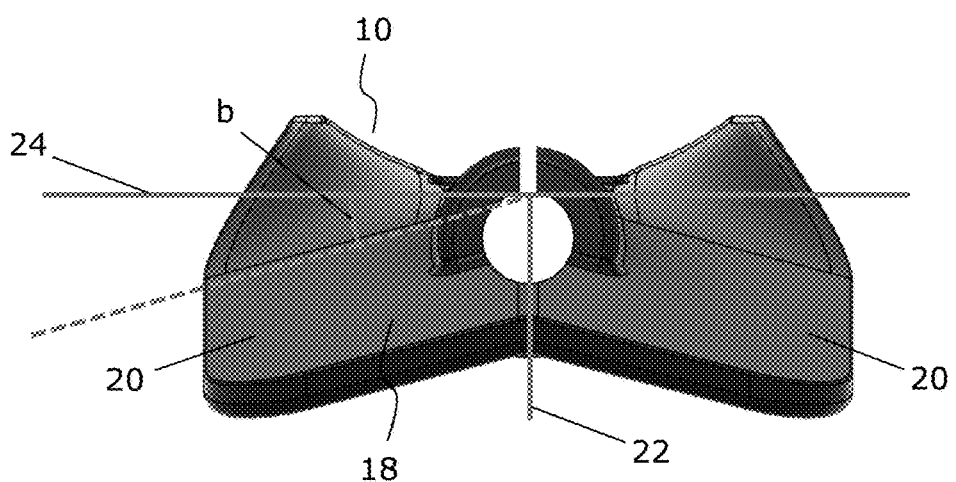
Fig. 3C

FISHING CAMERA

FIELD

The invention relates to an underwater video camera, and in particular to an underwater video camera to be pulled in front of a trolled bait.

BACKGROUND

Trolling is a method of fishing where a fishing line, baited with lures or bait fish, is drawn through the water. This may be behind a moving boat, or by winding the line in with a fishing reel from a static position (referred to as the retrieve), or even sweeping the line from side-to-side, e.g. when fishing from a jetty. Fishing lures are artificial baits designed to mimic real prey animals and attract the attention of predatory fish during the retrieve, using appearances, colors, reflections, movements, and vibrations, and most are equipped with one or more hooks that come in various styles.

It is often of interest to be able to see how the bait moves during trolling and to see any fish approaching or biting at the bait, and several attempt of underwater video cameras for this purposed have been proposed.

US 2017/042136 and US 2018/192624 are examples of lures with integrated cameras. Here, the hooks are attached directly to the camera housing, these are therefore not meant to be attached to a line in front of and separate from a lure. It is presumed that the fish will bite over the entire lure-camera-assembly. The tongue and fins on these lure-cameras are designed for the lure to imitate natural bait movements during trolling which would result in very unsteady video recordings.

CN 216700109, U.S. Pat. Nos. 9,507,243 and 8,515,269 relate to cameras be attached to a line in front of and separate from a lure. The references describe that the shapes and fins are designed to stabilize the depth and movement of the camera when being pulled through the water.

SUMMARY

Accordingly, there is a need for methods for underwater fishing cameras with improved stability and depth control during trolling, which may mitigate, alleviate or address the shortcomings of existing fishing cameras.

An underwater camera assembly is disclosed, to be pulled through water in a forward direction, such as by a line, preferably in front of and separate from a lure attached to the same line or an extension of the line.

An underwater camera assembly to be pulled through water in a forward direction is disclosed. The camera assembly comprises an elongated main body having a front-end part and a rear-end part and an upper part and a lower part, the main body holding a camera in a waterproof manner with a camera aperture being aligned with a backward facing window in the rear-end part. The camera assembly comprises a line attachment system, preferably positioned on the lower part of the main body, and being configured to secure the main body to a section of a line. The camera assembly comprises a front tongue extending downwardly and forwardly from the lower part of the front-end part and configured to exert a downward force on the main body when the assembly is pulled through water in the forward direction. The camera assembly comprises at least two stabilizers extending laterally from the rear-end part at symmetrical angles between 10°-80° from a vertical direction, and an optional at least one stabilizer extending laterally and in a vertical direction from the rear-end part. Also, the camera assembly preferably has positive buoyancy in fresh water.

In exemplary embodiments, the at least two stabilizers extend laterally from the upper part of the rear-end part. In exemplary embodiments, the optional at least one stabilizer extends laterally and in a vertical downward direction from the lower part of the rear-end part.

Throughout the description, 'depth' refers to the vertical distance to the surface of a body of water when the camera assembly is being trolled and "line" refers to a fishing line or other filament used to pull the camera assembly through the water.

BRIEF DESCRIPTION OF THE DRAWINGS

The above and other features and advantages of the present disclosure will become readily apparent to those skilled in the art by the following detailed description of examples thereof with reference to the attached drawings, in which:

FIGS. 3A-C are perspective, side, and front views, respectively, of a front tongue according to the disclosure.

DETAILED DESCRIPTION

Figure 1:
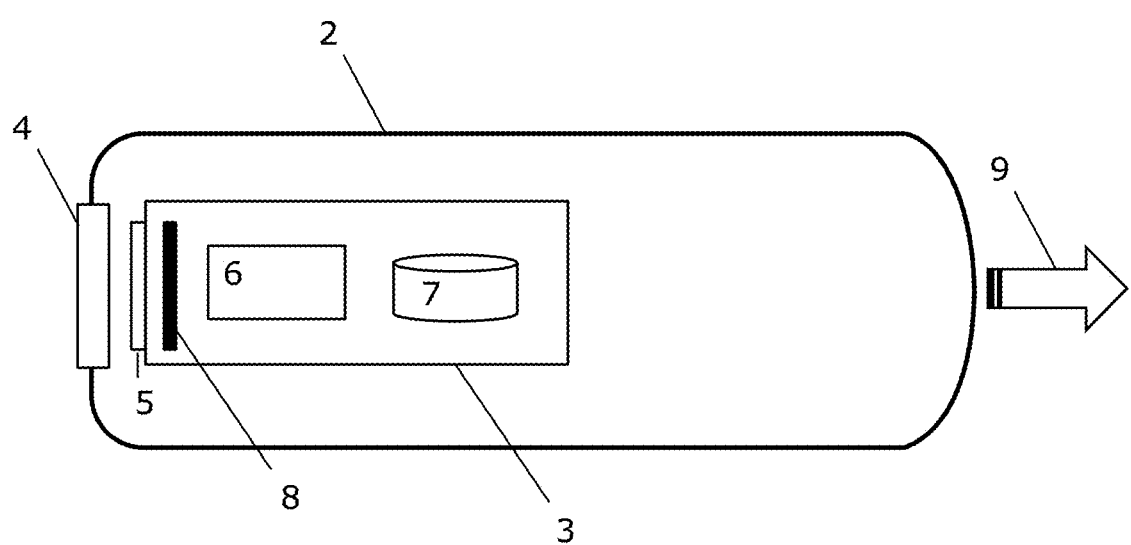
FIG. 1 is an illustration of an elongated main body holding a camera in accordance with the disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

An underwater camera assembly to be pulled through water in a forward direction is disclosed. The camera assembly comprises an elongated main body having a front-end part and a rear-end part and an upper part and a lower part. In an exemplary embodiment, the elongated main body may be described by or have an at least substantially cylindrical shape with length, L, and radius, r, see FIG. 2A. Referring to the depictions of an exemplary main body in the figures, it is to be understood that this generalized shape serves the purpose of providing approximate dimensions for the main body, and that deviations from a purely cylindrical shape are withing the scope of the at least substantially cylindrical shape. For example, the cross section may not be a circle but could be slightly oval or elliptical and may change along the length of the elongated main body. Also, the exterior surface may have indentations or protrusions that make it easier to grip and hold. Thereby, the radius, r, may be regarded as a mean, average, or median parameter of the cross section. Also, the end parts may be rounded off so that the length may change across the cross-section. Thereby, the length, L, may be regarded as a mean, average, or median parameter of the length across the cross section.

The main body holds a camera in a waterproof manner with a camera aperture being aligned with a backward facing window in the rear-end part. The main body may be a water-proof case for a self-contained camera can be placed inside and taken out of the main body, or the main body may be the housing of camera hard-ware fixedly mounted inside the main body.

The camera assembly comprises a line attachment system configured to secure the main body to a line or a filament, preferably in such a way that the elongated main body is aligned with the continuous section of the filament. In exemplary embodiments, the line attachment system is positioned on the lower part of the main body. In other exemplary embodiments, the line attachment system can be positioned on the upper part of the main body or extend through the main body, such as along a longitudinal center axis of the elongated main body.

In an exemplary embodiment, the line attachment system comprises an elongated tubular element, such as a tube, a pipe, or a hose. The tubular element can be attached to the main body, such as the lower part of the main body, extending at least substantially parallel to a longitudinal center axis of the elongated main body. The line attachment system may be configured to secure the main body to the line section by threading the line section through the elongated tubular element. A stop larger than an inner diameter of the tubular element may then be added to the line section where it exits a rear-end of the tubular element, so that when the line is retrieved, the stop engages the rear-end of the tube and pulls the camera assembly forward. The stop may for example be a swivel, a split shot sinker, or a knot. This configuration of the line attachment system is advantageous since, if the line segment breaks, the camera assembly may slide off the line segment and rise to the surface where it can be recovered.

When the camera assembly is in use, a main line, or a separate line section such as a leader attached to the main line or the camera assembly (or to the tubular element or the stop, where present), extends backwards from the camera assembly and can be attached to a lure comprising a hook. Thereby, during retrieval of the main line, the lure will be trailing the camera assembly.

In a preferred embodiment, the underwater camera assembly is not a lure such as a lure comprising a fishing hook. In a preferred embodiment, the underwater camera assembly according to the disclosure does not comprise a fishing hook, nor is a fishing hook attached, such as directly attached via metal links, to the main body. In exemplary embodiments, the line attachment system is configured to secure the main body to the line section by threading the line section through a tubular element, and any fishing hook may be attached to the line section such as in the form of a lure. Thereby, no fishing hook is attached, such as directly attached via metal links, to the main body.

Lures that mimic real prey animals using movements and vibrations, herein referred to as wobbling lures, present a challenge to a fishing camera to be pulled in front of and separate from a lure, because the movements and vibrations will transfer to the fishing camera attached to the same line. There are numerous types and classes of such wobbling lures, such as spinner baits, spoon baits, wobblers, plugs, crankbaits, twitchbaits, minnows, swimbaits, etc. It is an important design feature of a fishing camera that the camera is stable when pulled through the water, i.e. with little or no wobbling, even when a wobbling lure is attached to the same line.

One way to reduce wobbling is to give the fishing camera a proportionally larger inertial mass than the wobbling lure. Thereby, the jerking of the line caused by the wobbling lure will result in a proportionally smaller wobbling of the camera. However, in sports and recreational fishing, the camera and lure will often be casted with a rod. For fishing rods, the casting weight is a weight interval (of led, lure, camera etc.) that the rod is designed to work within, or the minimum and maximum weight with which the rod will allow you to cast a maximum distance. Whereas most rods have a maximum casting weight of less than 100 g, specialized large-game rods with casting weights of up to 800 g are commercially available. Hence, when designing a fishing camera, there are opposing objectives to make the camera as heavy as possible to reduce wobbling transfer from the lure and as light as possible to ensure compatibility with as large a range of fishing rods as possible. The present invention aims at providing a lightweight fishing camera with broad fishing rod compatibility and reduced wobbling transfer from the lure. Therefore, the camera assembly comprises a front tongue extending downwardly and forwardly from the lower part of the front-end part; and at least two stabilizers extending laterally from the upper rear-end part of the main body and an optional at least one stabilizer extending laterally and in a vertical downward direction from the lower rear-end part. Hereinafter, the term 'stabilizer(s)' or 'fin(s)' or 'stabilizing fins(s)' are used to refer to the at least two stabilizers extending laterally from the upper part and the optional at least one stabilizer extending laterally in a vertical direction from the lower part, whichever applies.

Another reason to provide a lightweight camera is to have a camera assembly with a positive buoyancy in water. With a heavier camera, the volume of the camera would have to be larger which would result larger drag and higher visibility for the fish. In an exemplary embodiment, the camera assembly preferably has positive buoyancy in fresh water. Positive buoyancy is advantageous since it will rise to the surface in case of line failures, which gives the user a chance to retrieve the camera.

Another challenge in fishing camera design is depth control during trolling. Most lures will have negative buoyancy and a given fluid-dynamical shape that together with the trolling speed, the regularity of the trolling, and the angle of the line towards the surface controls the trolling depth—i.e. how far below the surface the lure will move. Attaching a fishing camera, especially one with positive buoyancy, to the same line in front of and separate from the lure will drastically change the depth control of the lure. To control a trolling depth, the camera assembly comprises the front tongue extending downwardly and forwardly from the lower part of the front-end part and configured to exert a downward force on the main body when the assembly is pulled through water in the forward direction.

As described above, the front tongue of the disclosed camera assembly provides two functions during retrieval of the line and camera assembly:
   a) it creates a downforce which, balanced with the upward drag from the line and possible non-neutral buoyancy and stabilizers or vanes of the camera assembly, makes the camera assembly go to a given depth, and b) it stabilizes the front end of the camera assembly to reduce wobbling transfer from the lure and increase the steadiness of the camera assembly.

A front tongue, also commonly referred to as lip, vane, blade, or spoon, are known from the class of lures called wobblers. The tongue of a wobbler causes two effects when the wobbler is retrieved:

1) it creates a downforce which makes the wobbler hesitate and go to a given depth, and
2) it causes the wobbler to perform a wobbling motion mimicking the swimming motion of a prey fish, also referred to as the "game" of the lure.

The tongue in a wobbler has four main parameters: length and width (area), slope, and configuration. In general, the longer the tongue, the greater the working depth of the wobbler. The wider the tongue, the larger its area, the more intense the game of the wobbler becomes. However, the lateral disturbing forces increase significantly with the area, and with insufficient stability, the wobbler may "fall over" and lose the game or even be pushed to the surface. The greatest swinging effect is achieved when the downward slope of the tongue is perpendicular to the direction of movement. Equally important for the movements the wobbler is the configuration of the tongue. For better interaction with the oncoming water stream, the forward-facing surface of the tongue of a wobbler is usually slightly concave.

Extensive tests have been performed with tongues with different configurations. If the downward slope of the front tongue is too shallow, it will be difficult for the assembly to start diving and it may 'tumble' at the surface when being pulled in. It the downward slope of the front tongue is too steep, the assembly may dive quickly but will act as a wobbling lure with strong sideway movements disturbing the recordings. Therefore, in an exemplary embodiment, a downward slope of the front tongue relative to a longitudinal center axis of the elongated main body is between 5-30 degrees, preferably between 10-20 degrees.

Another variable in the testing of tongue configurations was to give the upper surface part of the front tongue oblique surfaces symmetrically slanting sideways and downwardly, see FIG. 3C. It was discovered that these sideways downslanting surfaces had a further stabilizing effect. Hence, in an exemplary embodiment, an upper surface part of the front tongue involves oblique surface parts, symmetrically slanting sideways and downwardly from a forward-backward center axis of the upper surface part. The oblique surfaces serve to make the forward-facing upper surface part of the tongue slightly convex. In an exemplary embodiment, a downward angle of the oblique surface parts is between 5-25 degrees, preferably between 10-20 degrees.

The size of the tongue where also varied during the extensive testing with different tongue configurations. In an exemplary embodiment, an upper surface part of the front tongue has a surface area $A_t=(2r)^2\pm20\%$ such as $A_t=(2r)^2\pm50\%$.

The camera assembly comprises:
at least two stabilizers extending laterally from the rear-end part, such as from the upper part of the rear-end part, at symmetrical angles between 10°-80° from a vertical direction; and
an optional at least one stabilizer extending laterally and in a vertical direction from the rear-end part, such as in a vertical downward direction from the lower part of the rear-end part.

The at least two and the at least one stabilizers preferably extends from opposite upper/lower parts of the rear-end part of the main body, such as to form a 'Y'-shape or an inverted 'Y'-shape.

The stabilizer(s) generate drag for lateral motions and/or rolling of the rear-end of the camera assembly, thereby reducing wobbling transfer from the lure and increasing the steadiness of the camera assembly. In an exemplary embodiment, the stabilizers extend at least a length $L_s=2r\pm20\%$ from the rear-end part of the elongated body. In an exemplary embodiment, the stabilizers have a width $W_s$, which may be described as a length along the longitudinal direction of the camera body. In exemplary embodiments, $W_s=r\pm50\%$.

In an exemplary embodiment, the symmetrical angles of the at least two stabilizers are between 45-75 degrees from a vertical direction.

For additional depth control and stability, and potentially to adjust pitch caused by the downforce of the front tongue, a weight may be added to the downward stabilizer (when present). Hence, in an exemplary embodiment, the at least one stabilizer comprises means for holding a weigh with a mass between 2-20 grams, preferably 5-15 grams. Such added weight to the downward stabilizer makes it act as a keel to reduce roll and slightly increases the inertial mass of the camera assembly which, as discussed above, helps to reduce wobbling transfer from the lure. Too much added weight, however, will increase the total weight of the assembly and reduce rod compatibility.

During use, the line bay become 'hooked' by any of the stabilizing fins. Therefore, to allow the line to easily 'unhook' itself by gliding along a leading edge of the stabilizing fins, leading edges of the stabilizing fins may slope backwards.

FIG. 1 illustrates an elongated main body 2 holding a camera 3 in a waterproof manner. The camera, preferably a video camera, may comprise an aperture 5, an image sensor 8, an electronic processor 6 and digital storage 7, with the camera aperture 5 being aligned with a backward facing window 4 in the rear-end part of the main body 2. The main body is configured to be pulled in a forward direction indicated by arrow 9.

Figure 2A:
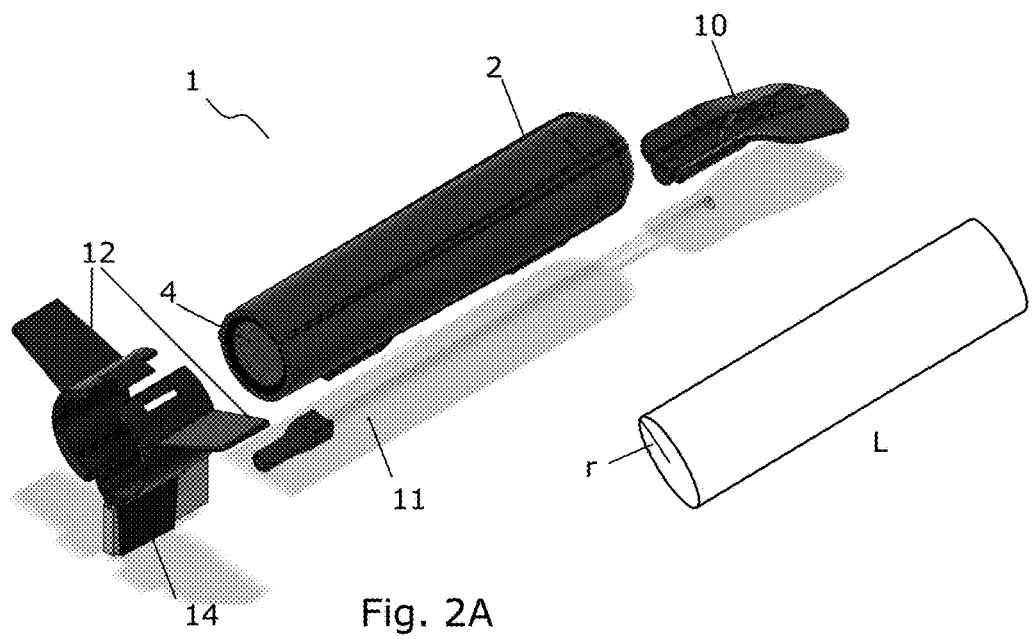
FIGS. 2A and 2B are perspective exploded (2A) and assembled (2B) views of an exemplary camera assembly of the disclosure.
Figure 2B:
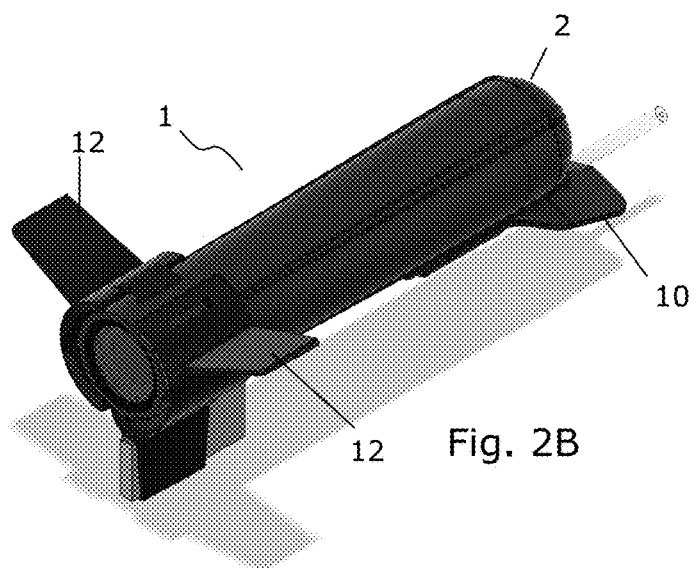
Figure 2C:
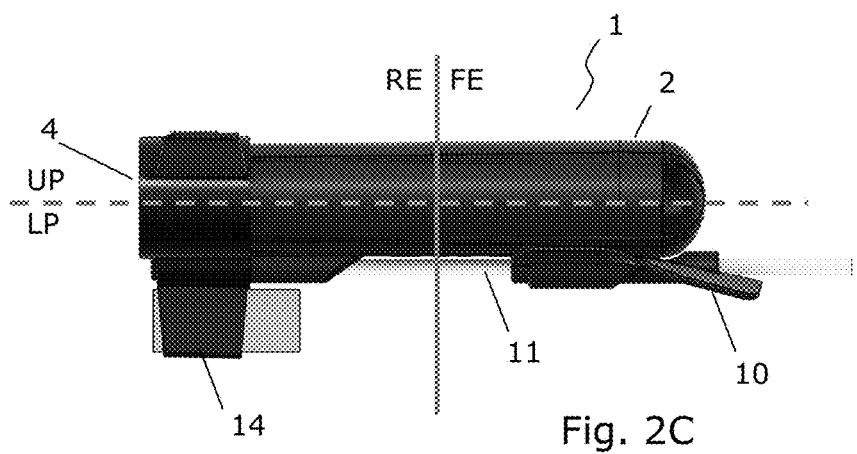
FIG. 2C is a side-view of an assembled exemplary camera assembly of the disclosure.

FIGS. 2A and 2B are perspective exploded (2A) and assembled (2B) views of an exemplary embodiment of the camera assembly. FIG. 2C is a side-view of an assembled exemplary embodiment of the camera assembly.

In FIGS. 2A-C, an underwater camera assembly 1 is disclosed. The camera assembly 1 comprises an elongated main body 2.

For the purpose of referencing positions on the main body, the elongated main body 2 comprises a front-end part FE and a rear-end part RE, divided as indicated by the vertical full line in FIG. 2C. The elongated main body 2 also comprises an upper part UP and a lower part LP, divided as indicated by the horizontal dashed line in FIG. 2C.

FIG. 2A also illustrates a cylinder with length, L, and radius, r, serving the purpose of indicating the length and radius of an at least substantially cylindrical shape of exemplary embodiments of the elongated main body 2. The dimensions of the camera assembly are balanced to make the assembly as small as possible to decrease its inertial mass, drag during retrieval, and visibility for the fish, but large enough to ensure easy handling for the user, also in situations with cold finds and possibly gloves. In exemplary embodiments, $L \in [50\ mm;\ 200\ mm]$ and $r \in [5\ mm;\ 20\ mm]$.

The main body holds a camera (not shown) in a waterproof manner with a camera aperture (not shown) being aligned with a backward facing window 4 in the rear-end part RE, see also Fig. depicting the camera.

In FIGS. 2A-C, the camera assembly 1 comprises a line attachment system 11 positioned on the lower part LP of the main body 2 and configured to secure the main body to a section of a fishing line.

In FIGS. 2A-C, the camera assembly 1 comprises a front tongue 10 extending downwardly and forwardly from the lower part LP of the front-end part FE. The front tongue 10 is arranged on the main body 10 so that it produces a downward force on the main body 2 when the assembly 1 is pulled through water in the forward direction 9.

In FIGS. 2A-C, the camera assembly 1 comprises at least two stabilizers extending laterally from the upper part UP of the rear-end part RE and at least one stabilizer 14 extending laterally from the lower part LP of the rear-end part RE. In all the depictions of the camera assembly 1, both the at least two stabilizers 12 and the at least one stabilizer 14 are included. Embodiments comprising only one of the at least two stabilizers 12 or the at least one stabilizer 14 are not shown. it will be understood that this is not intended to limit the claimed disclosure, and it will be made obvious to those skilled in the art that embodiments with only stabilizers 12 may be made without departing from the scope of the claimed disclosure. The specification and drawings are, accordingly, to be regarded in an illustrative rather than restrictive sense.

FIGS. 3A-C are perspective, side, and front views, respectively, of a front tongue according to the disclosure. One part of the front tongue 10 may primarily serve the purpose of attaching the tongue to the main body and making room for or integrating the line attachment system. Therefore, the part of the front tongue that produces a downward force on the main body when pulled in the forward direction can be assigned to an upper surface part 18 of the front tongue 10, defined by width $W_t$ and length $L_t$ in FIG. 3A. The width $W_t$ and length $L_t$ defines a surface area $A_t=W_t \times L_t$ of the upper surface part 18. In an exemplary embodiment, $W_t=2r\pm20\%$ for the front tongue to provide the needed downforce without making the camera assembly unstable. In an exemplary embodiment, $L_t=2r\pm20\%$ for the front tongue to provide the needed downforce without making the camera assembly unstable. In an exemplary embodiment, $A_t=(2r)^2\pm20\%$, such as $\pm50\%$, for the front tongue to provide the needed downforce without making the camera assembly unstable.

As illustrated In FIG. 3B, the front tongue 10 has a downward slope described by angle a relative to a center axis 16 of the elongated main body. It is preferred that a is between 5-30 degrees, such as in between 10-20 degrees.

As illustrated In FIG. 3B, in exemplary embodiments of the front tongue 10, the upper surface part 18 involves oblique surface parts 20, symmetrically slanting sideways and downwardly from a forward-backward center axis 22 of the upper surface part 18. The oblique surface parts slants sideways with a downward angle b relative to a horizontal axis 24. In exemplary embodiments, the angle b is between 5-25 degrees such as 10-20 degrees.

Figure 4A:
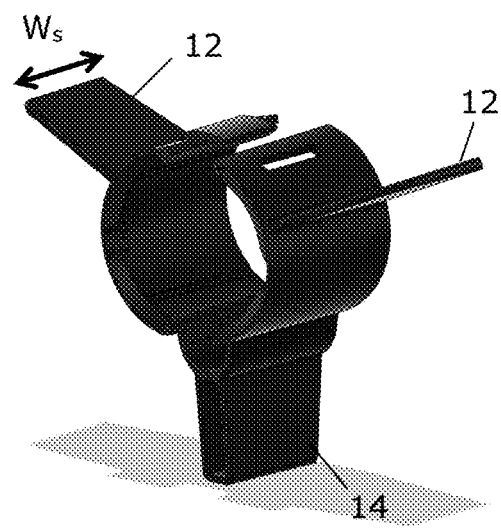
FIGS. 4A-C are perspective, side, and front views, respectively, of stabilizers according to the disclosure.
Figure 4B:
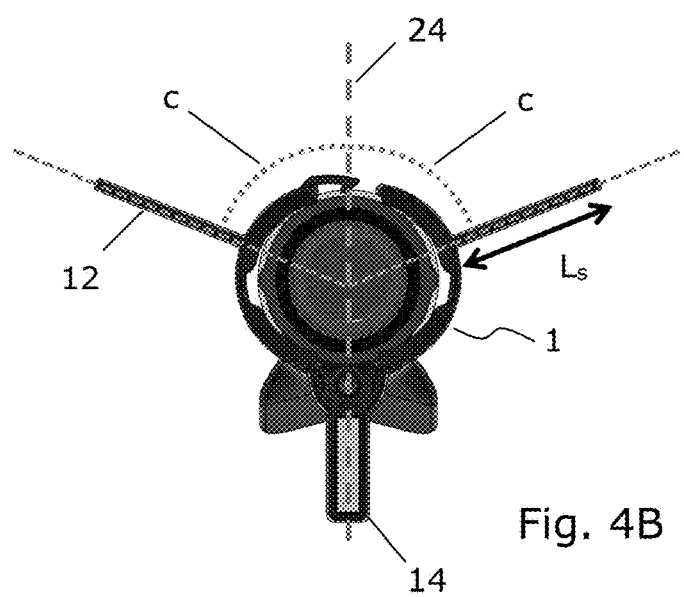
Figure 4C:
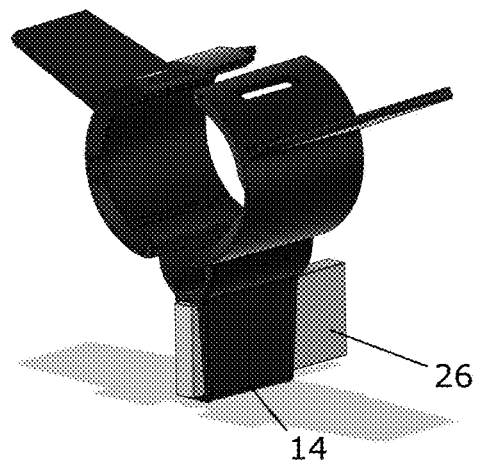

FIGS. 4A-C are perspective, side, and front views, respectively, of preferred stabilizers according to the disclosure.

As shown in FIG. 4B, the stabilizers 12 and 14 extends from opposite upper and lower parts, respectively, of the rear-end part of the main body, so as to form a 'Y'-shape. In another embodiment, not shown, the stabilizers 12 and 14 extends from opposite lower and upper parts, respectively, of the rear-end part of the main body, so as to form an inverted 'Y'-shape.

The camera assembly comprises at least two stabilizers 12 extending laterally from the upper part UP of the rear-end part RE. The stabilizers 12 may or may not be directed along a radius of the main body. As illustrated in FIG. 4B, the stabilizers 12 have symmetrical angles c with respect to a vertical axis 24. In exemplary embodiments, c is between 10°-80 degrees, such as between 45-75 degrees.

The size of the stabilizers 12 is a balance between stabilizing the assembly by generating drag for lateral motions and/or rolling, and generating more drag for forwards motions, increasing visibility for the fish and increased risk for hoking the line. As illustrated in FIG. 4B, the stabilizers 12 extend a length $L_s$ from the upper part of the rear-end part of the elongated body. In exemplary embodiments, $L_s=2r\pm20\%$. As illustrated in FIG. 4A, the stabilizers 12 have a width $W_s$, which may be described as a length along the longitudinal direction of the camera body. In exemplary embodiments, $W_s=r\pm50\%$.

In an exemplary embodiment, the camera assembly comprises at least one stabilizer 14 extending laterally from the lower part LP of the rear-end part RE. The stabilizer 14 is preferably directed along a radius of the main body.

As for stabilizers 12, the size of the stabilizer 14 is a balance between stabilizing the assembly by generating drag for lateral motions and/or rolling, and generating more drag for forwards motions, increasing visibility for the fish and increased risk for hoking the line. The stabilizer 14 preferably has a width and length in the ranges given above for stabilizers 12.

In an exemplary embodiment illustrated in FIG. 4C, the camera assembly comprises a weight 26, preferably metal, and the stabilizer 14 comprises means for, or is configured to, holding the weight.

The illustrations of FIGS. 4A-C shows stabilizers 12, 14 as part of a unit that can be opened/closed to be detachable from the main body and which make room for or integrate the line attachment system.

It is to be noted that the word "comprising" does not necessarily exclude the presence of other elements or steps than those listed.

It is to be noted that the words "a" or "an" preceding an element do not exclude the presence of a plurality of such elements.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense.

The invention claimed is:

1. A lightweight underwater camera assembly to be pulled through water in a forward direction, comprising:
    an elongated main body having a substantially cylindrical shape with radius, r, and a front-end part and a rear-end part and an upper part and a lower part, the main body holding a camera in a waterproof manner with a camera aperture being aligned with a backward facing window in the rear-end part;
    a line attachment system configured to secure the main body to a section of a line, wherein the line attachment system is positioned on the lower part of the main body;
    a lip extending downwardly and forwardly from the lower part of the front-end part, wherein the lip comprises an upper surface part that has a width $W_t$ with $W_t=2r\pm20\%$, is forward-facing and directly attached to the lower part of the front-end part of the main body and configured to exert a downward force on the main body when the assembly is pulled through water in the forward direction; and at least two stabilizers extending laterally from the rear-end part at symmetrical angles between 10-80 degrees from a vertical direction;

wherein a downward slope of the lip relative to a longitudinal center axis of the elongated main body is between 5-30 degrees and wherein the lightweight underwater camera assembly has positive buoyancy in freshwater and a mass of less than 100 grams.

2. The lightweight underwater camera assembly according to claim 1, wherein the upper surface part of the lip has a surface area $A_r=(2r)^2\pm50\%$.

3. The lightweight underwater camera assembly according to claim 1, wherein the upper surface part of the lip involves oblique surface parts, symmetrically slanting sideways and downwardly from a forward-backward center axis of the upper surface part.

4. The lightweight underwater camera assembly according to claim 3, wherein a downward angle of the oblique surface parts is between 5-25 degrees.

5. The lightweight underwater camera assembly according to claim 1, wherein the symmetrical angles of the at least two stabilizers are between 45-75 degrees from a vertical direction.

6. The lightweight underwater camera assembly according to claim 1, wherein the stabilizers extend at least a length $L_s=2r\pm20\%$ from the rear-end part of the elongated body.

7. The lightweight underwater camera assembly according to claim 1, wherein the camera assembly comprises at least one stabilizer extending laterally and in a vertical direction from the lower part of the rear-end part and a metal weight, and wherein the at least one stabilizer is configured to hold the metal weight.

8. The lightweight underwater camera assembly according to claim 1, wherein the lip and the stabilizers are detachable.

9. The lightweight underwater camera assembly according to claim 1, wherein the line attachment system comprises an elongated tubular element, and wherein the line attachment system is configured to secure the main body to the line section by threading the line section through the elongated tubular element.

10. The lightweight underwater camera assembly according to claim 1, wherein no fishing hook is attached to the main body.

* * * * *